(12) United States Patent
Kuo

(10) Patent No.: US 6,294,210 B1
(45) Date of Patent: *Sep. 25, 2001

(54) OXYGEN PERMEABLE MULTILAYER FILM

(75) Inventor: Betsy P. Kuo, Greenville, SC (US)

(73) Assignee: Cryovac, Inc., Duncan, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/929,358

(22) Filed: Sep. 12, 1997

Related U.S. Application Data

(62) Division of application No. 08/459,881, filed on Jun. 2, 1995, now Pat. No. 5,849,127, which is a division of application No. 08/218,776, filed on Mar. 28, 1994, now Pat. No. 5,491,019.

(51) Int. Cl.[7] .............................. B64G 25/04; B64G 55/00
(52) U.S. Cl. ..................... 426/127; 428/35.2; 426/106; 426/415; 426/419; 206/213.1; 206/524.1
(58) Field of Search .................................. 428/515, 516, 428/213, 35.2; 53/451; 426/106, 415, 127, 419; 264/173.14, 173.16; 206/524.1, 213.1

(56) References Cited

U.S. PATENT DOCUMENTS

| | | | |
|---|---|---|---|
| 2,676,943 | 4/1954 | Carson | 260/31.8 |
| 2,772,172 | 11/1956 | Carson | 99/174 |
| 2,835,595 | 5/1958 | Salatiello | 99/174 |
| 2,900,260 | 8/1959 | Snyder et al. | 99/174 |

(List continued on next page.)

FOREIGN PATENT DOCUMENTS

| | | |
|---|---|---|
| 0 450 088 A1 | 10/1991 | (EP). |
| 0 580 377 A1 | 1/1997 | (EP). |
| 1 334 616 | 10/1973 | (GB). |
| 102762/83 | 6/1983 | (JP). |
| 05096690 | 10/1993 | (JP). |
| WO 90/03414 | 4/1990 | (WO). |
| 92/14784 | 9/1992 | (WO). |
| WO 93/03093 | 2/1993 | (WO). |
| WO 93/12151 | 6/1993 | (WO). |
| WO 95/26269 | 10/1995 | (WO). |

OTHER PUBLICATIONS

L. Wild et al, Determination of Branching Distributions in Polyethylene and Ethylene Copolymers', J. Poly. Sci., vol. 20, (1982) pp. 441–455.

A. Schulman, Inc., Material Safety Data Sheet, pp. 1–3 (May 1992).

Frank Kuber, "Dreams of the perfect plastic", New Scientist, Aug. 14, 1993, pp. 28–31.

Ready Pac Advertisement, "The Packer/California Lettuce", A Vance Publication, Aug. 14, 1995, 1 page.

(List continued on next page.)

Primary Examiner—Paul Thibodeau
Assistant Examiner—D. Lawrence Tarazano
(74) Attorney, Agent, or Firm—Daniel B. Ruble

(57) ABSTRACT

A multilayer film comprises: a first layer comprising a first homogeneous ethylene/α-olefin copolymer; a second layer comprising a polyolefin; and a third layer comprising a second homogeneous ethylene/α-olefin copolymer. The second layer is between the first layer and the third layer, the second layer is chemically different from the first layer and the third layer, and the multilayer film has an oxygen transmission rate of from about 500 to 50,000 cc/m$^2$/24 hr STP. Also disclosed are a process for making the film, a packaging process using the film, and a product packaged in the film. The film is especially suitable for the packaging of oxygen-sensitive products, such as lettuce, and exhibits exceptional hot tack seal strength.

37 Claims, 4 Drawing Sheets

U.S. PATENT DOCUMENTS

| | | | |
|---|---|---|---|
| 2,900,261 | 8/1959 | Snyder et al. | 99/174 |
| 2,903,829 | 9/1959 | Wolff | 53/28 |
| 2,931,732 | 4/1960 | Hoffman et al. | 99/174 |
| 2,956,383 | 10/1960 | Gausman | 53/124 |
| 2,960,808 | 11/1960 | Pike | 53/24 |
| 2,961,322 | 11/1960 | Winterberg | 99/166 |
| 2,988,452 | 6/1961 | Cameron | 99/194 |
| 3,003,884 | 10/1961 | Andrews | 99/174 |
| 3,047,404 | 7/1962 | Vaughan | 99/174 |
| 3,099,350 | 7/1963 | Hammond | 206/46 |
| 3,193,392 | 7/1965 | Lundquist et al. | 99/174 |
| 3,205,077 | 9/1965 | Hammond | 99/174 |
| 3,222,191 | 12/1965 | Steiner et al. | 99/174 |
| 3,222,210 | 12/1965 | Hammond | 117/68 |
| 3,340,129 | 9/1967 | Grevich | 156/498 |
| 3,426,499 | 2/1969 | Paige | 53/28 |
| 3,560,325 | 2/1971 | Sogi et al. | 161/165 |
| 3,574,642 | 4/1971 | Weinke | 99/174 |
| 3,608,709 | 9/1971 | Pike | 206/47 A |
| 3,611,657 | 10/1971 | Inoue et al. | 53/64 |
| 3,661,322 | 5/1972 | Norman | 229/55 |
| 3,703,796 | 11/1972 | Inoue et al. | 53/180 |
| 3,713,849 | 1/1973 | Grindrod et al. | 99/174 |
| 3,882,259 | 5/1975 | Nohara et al. | 428/35 |
| 4,055,672 | 10/1977 | Hirsch et al. | 426/127 |
| 4,103,473 | 8/1978 | Bast et al. | 53/180 M |
| 4,106,261 | 8/1978 | Greenawalt | 53/27 |
| 4,135,026 | 1/1979 | Hoyt et al. | 428/220 |
| 4,147,827 * | 4/1979 | Breidt, Jr. et al. | 428/218 |
| 4,302,565 | 11/1981 | Goeke et al. | 526/88 |
| 4,506,494 | 3/1985 | Shimoyama et al. | 53/551 |
| 4,532,752 | 8/1985 | Taylor | 53/451 |
| 4,532,753 | 8/1985 | Kovacs | 53/451 |
| 4,571,926 | 2/1986 | Scully | 53/525 |
| 4,589,247 | 5/1986 | Tsurata et al. | 53/550 |
| 4,642,239 | 2/1987 | Ferrar et al. | 426/396 |
| 4,746,689 | 5/1988 | Sullivan | 523/348 |
| 4,797,235 | 1/1989 | Garland et al. | 264/22 |
| 4,830,863 | 5/1989 | Jones | 426/118 |
| 4,876,146 | 10/1989 | Isaka et al. | 428/347 |
| 4,886,690 | 12/1989 | Davis et al. | 428/36.6 |
| 4,889,731 | 12/1989 | Williams, Jr. | 426/106 |
| 4,894,107 | 1/1990 | Tse et al. | 156/229 |
| 4,897,274 | 1/1990 | Candida et al. | 426/127 |
| 4,910,032 | 3/1990 | Antoon, Jr. | 426/118 |
| 4,927,691 | 5/1990 | Bekele | 428/35.2 |
| 4,935,271 | 6/1990 | Schirmer | 428/35.2 |
| 4,937,115 | 6/1990 | Leatherman | 428/36.4 |
| 4,949,847 | 8/1990 | Nagata | 206/484.1 |
| 4,952,451 | 8/1990 | Mueller | 428/218 |
| 4,956,209 | 9/1990 | Isaka et al. | 428/35.2 |
| 4,956,212 | 9/1990 | Bekele | 428/36.6 |
| 4,963,427 | 10/1990 | Botto et al. | 428/215 |
| 4,985,188 | 1/1991 | Ishio et al. | 264/22 |
| 4,996,071 | 2/1991 | Bell | 426/415 |
| 5,004,647 | 4/1991 | Shah | 428/349 |
| 5,069,955 | 12/1991 | Tse et al. | 428/213 |
| 5,110,677 | 5/1992 | Barmore et al. | 428/349 |
| 5,112,674 | 5/1992 | German et al. | 428/216 |
| 5,145,950 | 9/1992 | Funaki et al. | 528/481 |
| 5,206,075 | 4/1993 | Hodgson, Jr. | 428/216 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,296,170 | 3/1994 | Noritsugu et al. | 264/22 |
| 5,332,616 | 7/1994 | Patrick et al. | 428/218 |
| 5,407,611 | 4/1995 | Wilhoit et al. | 264/22 |
| 5,427,807 | 6/1995 | Chum et al. | 426/393 |
| 5,484,654 | 1/1996 | Mueller | 428/332 |
| 5,523,136 | 6/1996 | Fischer et al. | 428/35.2 |

OTHER PUBLICATIONS

ICI Surfactants, ATMER 8174, Super Concentrate Product Information Bulletin, (Aug. 1993).

A. Schulman Inc., Technical Data, Polybatch AF 1085, Sep. 1993.

ICI Surfactants, ATMER Polymer Additives, pp. 1–9 (undated).

ICI Polymer Additives, Atmer 8112 Super Concentrate Product Information Bulletin, pp. 1–8(Aug. 1991).

Atmer 8112 Super Concentrate Product Information Bulletin, pp. 1–8 (undate).

D. J. Michiels, "Fresh Produce: Packaging Film's Fastest Growing Market", Exxon Chemical Company, pp. 553–562 (undate).

* cited by examiner

OXYGEN PERMEABLE MULTILAYER FILM

This is a division of application Ser. No. 08/459,881, filed Jun. 2, 1995 and now U.S. Pat. No. 5,849,127, which is a division of application Ser. No. 08/218,776, filed Mar. 28, 1994 and now U.S. Pat. No. 5,491,019.

FIELD OF THE INVENTION

The present invention relates to multi-layer films, particularly multi-layer films suitable for use as packaging films. The present invention is also directed to processes of making multi-layer films, packaging processes, and packaged products. The present invention is particularly related to films suitable for packaging oxygen-sensitive products, such as lettuce.

BACKGROUND OF THE INVENTION

Multilayer films have been utilized for the packaging of "oxygen-sensitive products", such as lettuce, i.e., products which exhibit lower shelf life in the presence of either too much oxygen in the package, or too little oxygen in the package. In such multilayer films used for packaging oxygen-sensitive products, the oxygen transmission rate, and even the carbon dioxide transmission rate, are of primary importance, especially in the packaging of such oxygen-sensitive products as vegetables, fruits, and cheese. For example, in the packaging of precut lettuce, the presence of too much oxygen in the package results in enzymatic browning of cut surfaces, known as pink ribbing. On the other hand, if the concentration of oxygen in the package is too low, the lettuce tends to spoil due to anaerobiosis.

Cut lettuce is frequently packaged using vertical form fill and seal (VFFS) equipment. Produce packaging films used on VFFS equipment have been composed from a variety of materials, including polyethylene, ethylene vinyl acetate copolymer, ethylene methyl acrylate copolymer, blends of polyethylene and ethylene vinyl acetate, and polypropylene. Such films are typically multilayer films.

Furthermore, different products, such as lettuce and broccoli, exhibit maximum shelf life when packaged in films having oxygen transmission rates substantially different from one another. There are many oxygen-sensitive products having a shelf life which is dependent upon the oxygen transmission rate of the package within which they are contained, and the optimum oxygen transmission rates for the packaging of these products varies widely. As a result, it is desirable to provide a process for producing a variety of multilayer films having differing oxygen transmission rates.

Gas transmission rates for vegetable packaging films have traditionally been tailored to a desired level by varying the overall thickness of the multilayer film. That is, in order to achieve a desired, relatively high oxygen transmission rate, a thinner film is produced. Such downgauging is often done at the expense of film strength and abuse resistance. Conversely, film structures which are abuse-resistant and machinable generally lack the desired level of gas permeability and sealing properties required for such applications as use in vertical form fill and seal equipment. It is therefore desirable to provide a film which combines abuse resistance with a relatively high oxygen transmission rate.

Moreover, it would be desirable to utilize a film structure and composition which permits structural and compositional changes so that a set of multilayer films of a substantially singular thickness exhibit a relatively wide spectrum of oxygen transmission rates and carbon dioxide transmission rates. In this manner, overall film physical properties can be kept substantially constant, while at the same time films can be tailored to the optimal oxygen transmission rates and the optimal carbon dioxide transmission rates of a variety of oxygen-sensitive products.

Furthermore, it would be advantageous to provide such a film with a composition and structure which has desirable sealing characteristics, i.e., does not exhibit burn through, does not pucker at the seal, exhibits good hot tack, and seals quickly and at relatively low temperature, while simultaneously permitting optimization of oxygen and carbon dioxide transmission rates, via the ability to vary the structure and composition of the multilayer film, without substantially increasing or substantially decreasing the overall thickness of the multilayer film.

It is also important for multilayer films used in vertical form fill and seal equipment to have surface layers sealable with hot bar and impulse type sealing systems. Other desirable attributes are abuse resistance, clarity, and a modulus sufficient that the film has good machinability on vertical form fill and seal equipment.

Prior art films useful for the packaging of oxygen-sensitive products have been found to lack the combination of desirable OTR for maximum shelf life, machinability properties to run on vertical form fill and seal equipment, high hot tack strength, as well as optical properties such as high gloss and low haze.

Films used on vertical form fill and seal (VFFS) equipment are subjected to at least two different kinds of seals being produced during the packaging of the product, i.e., a longitudinal or vertical seal, and horizontal bottom and top seals. Accordingly, in the construction of such packages, characteristics such as the temperature required to form the seal, adequate heat resistance to prevent burn through, and a very high percentage of continuous (nondefective) seals, are all important in assessing the performance of any given film for the packaging of oxygen-sensitive products.

SUMMARY OF THE INVENTION

The multilayer packaging film of the present invention has desirable sealing characteristics, does not exhibit burn through, does not pucker at the seal, provides a very desirable level of hot tack strength, and has a desirable oxygen transmission rate and a desirable carbon dioxide transmission rate, while simultaneously providing very desirable optical properties, i.e., high gloss and low haze.

Furthermore, using the multilayer film of the present invention in VFFS equipment results in packages having a very low percentage of "leakers", i.e., packages having a defective seal. The desirable processing characteristics of the multilayer film of the present invention enable greater packaging speeds on VFFS equipment, as well as other packaging machinery. These desirable processing characteristics extend to other packaging operations in which the film is used as lidstock, overwrap, etc. The greater packaging speeds are due to the low seal temperature and high hot tack strength characteristics of the multilayer film of the present invention.

More particularly, the present invention relates to a multilayer film comprising a first layer, a second layer, and a third layer. The first layer comprises a first homogeneous ethylene/α-olefin copolymer. The second layer comprises a polyolefin. The third layer comprises a second homogeneous ethylene/α-olefin copolymer. The second layer is between the first layer and the third layer, and the second layer is chemically different from the first layer and the third layer. The multilayer film has an oxygen transmission rate of from about 500 to 50,000 cc/m$^2$/24 hr STP.

The present invention also relates to a process for making a multilayer film. The process comprises: (1) providing a first composition comprising a first homogeneous ethylene/α-olefin copolymer; (2) providing a second composition comprising a polyolefin; and (3) providing a third composition comprising a second homogeneous ethylene/α-olefin copolymer. The first, second, and third compositions are then extruded in order to form a respective first film layer, second film layer, and third film layer. The process is carried out so that the second layer is between the first layer and the third layer. The second layer is chemically different from the first layer and the third layer. The multilayer film has an oxygen transmission rate of from about 500 to 50,000 cc/m²/24 hr STP.

The present invention is also directed to a packaging process for packaging an oxygen-sensitive product. The process comprises: (A) supplying a vertical form fill and seal apparatus with a rollstock comprising the multilayer film of the present invention, as described herein; (B) forming a substantially vertically-oriented tube from the multilayer film, by passing the film over a collar member of the vertical form fill and seal apparatus, so that substantially vertically-oriented edge portions of the film are adjacent one another; (C) forming a longitudinal seal along at least a segment of the adjacent edge portions of the film, to form a sealed tube segment; (D) collapsing a lower end portion of the sealed tube segment, and forming a bottom package seal across the collapsed lower end portion of the sealed tube segment, to form a pouch; (E) adding an appropriate quantity of the oxygen-sensitive product to the pouch; and (F) collapsing an upper end portion of the sealed pouch, and forming a top package seal across the collapsed upper end portion of the sealed pouch, so that a sealed package is formed, the package containing the oxygen-sensitive product.

Finally, the present invention pertains to a packaged product. This packaged product comprises an oxygen-sensitive product and a package substantially surrounding the product. The package comprises the multilayer film of the present invention.

DETAILED DESCRIPTION OF THE INVENTION

Figure 1:
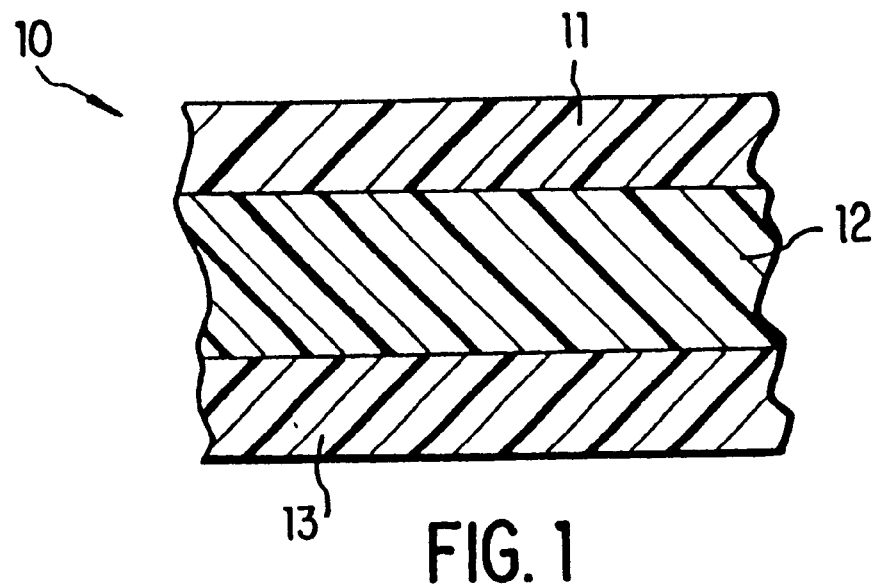
FIG. 1 illustrates an enlarged cross-sectional view of a three-layer multilayer film of the present invention.

As used herein, the term "monomer" refers to a relatively simple compound, usually containing carbon and of low molecular weight, which can react to form a polymer by combination with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an α-olefin, such as 1-hexene. However, the term "copolymer" is also inclusive of, for example, the copolymerization of a mixture of ethylene, propylene, 1-hexene, and 1-octene.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which the first listed monomer copolymerizes in a higher weight percent than the second listed monomer, and, for copolymers which are terpolymers, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/α-olefin copolymer"), identifies the comonomers which are copolymerized to produce the copolymer. This terminology, as used herein, refers to the primary comonomer first, followed by the secondary comonomer. The copolymerization is carried out in the presence of more (on a weight percent basis) of the primary comonomer than the secondary comonomer.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Such polymers exhibit a relatively even sequencing of comonomers within a chain, the mirroring of sequence distribution in all chains, and the similarity of length of all chains, and are typically prepared using metallocene, or other single-site type catalysis.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the term "polyolefin" refers to any polymerized olefin, which can be linear, branched, cyclic, aliphatic, aromatic, substituted, or unsubstituted.

As used herein, the phrase "ethylene alpha-olefin copolymer", and "ethylene/α-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/α-olefin copolymers, such as the long chain branched homogeneous ethylene/α-olefin copolymers available from the Dow Chemical Company, known as AFFINITY (TM) resins, are also included as another type of ethylene alpha-olefin copolymer useful in the present invention.

As used herein, the phrase "internal layer" refers to any film having its two principal surfaces with other layers of the multilayer film.

As used herein, the phrase "outer layer" refers to any film layer, of a multilayer film, having only one of its principal surfaces directly adhered to another layer of the film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus.

As used herein, the phrase "sealant layer", with respect to multilayer films, refers to an outer film layers, which are involved in the sealing of the film to itself or another layer. Although the phrase "sealant layer" as herein used refers only to outer layers, no matter how thin, it should also be recognized that in general, the outer 0.5 mil to 1.0 mil of a film is involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the phrase "skin layer" refers to an outermost layer of a multilayer film in packaging a product, this skin layer being subject to abuse.

As used herein, the term "lamination", and the phrase "laminated film", refer to the process, and resulting product, made by bonding together two or more layers of film or other materials. Lamination can be accomplished by joining layers with adhesives, joining with heat and pressure, and even spread coating and extrusion coating. Multilayer films can be made via coextrusion and/or lamination.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, "oxygen transmission rate", also referred to as "OTR" and "oxygen permeability", is measured according to ASTM D 3985, a test known to those of skill in the film art.

As used herein, the "melt index" of a polymer is the amount, in grams, of a thermoplastic resin which can be forced through an orifice of 0.0825 inch diameter when subjected to a force of 2160 grams in ten minutes at a specified temperature, e.g., 190° C. for many polymers. The test is performed by an extrusion rheometer described in ASTM D 1238.

Although the majority of the above definitions are substantially as understood by those of skill in the are, one or more of the above definitions may be defined hereinabove in a manner differing from the meaning as ordinarily understood by those of skill in the art, due to the particular description herein of the present invention.

FIG. 1 illustrates a cross-sectional view of a preferred embodiment of multilayer film 10 of the present invention. The film comprises first layer 11 (an outer layer), second layer 12 (a core layer), and third layer 13 (also an outer layer). Preferably, the first and third layers 11 and 13 are designed to serve as sealing layers, i.e, comprise a polymer suitable for forming a seal via the application of heat or radiation, as is known to those of skill in the art.

In general, the film of the present invention comprises at least 3 layers. The two outer layers function as sealing layers, while the sole core layer, or at least one of a plurality of inner layers, provides the multilayer film with a desired tensile properties, while permitting a desired level of transmission of oxygen and carbon dioxide therethrough. Preferably, the film comprises from 3 to 15 layers, and more preferably, from 3 to 7 layers, and still more preferably, from 3 to 5 layers. Most preferably, the film comprises 3 layers, as illustrated in FIG. 1, and most preferably, the outer layers, i.e., the first and third layers, are of substantially identical chemical composition and are of substantially identical thickness. In general, the core layer should be at least as thick as each of the outer layers, and preferably the core layer is thicker than either of the outer layers.

In the multilayer film according to the present invention, the second layer is "chemically different" from the first layer and the third layer, in order that there be at least three discrete film layers. That is, if the second layer is chemically identical to either the first layer or the third layer, the resulting film becomes the equivalent of a film having less than three layers.

In general, the multilayer film of the present invention can have any total thickness which provides a desired rate of oxygen and carbon dioxide transmission, abuse resistance, tensile strength, etc. Preferably, the multilayer film of the present invention has a total thickness (i.e., a combined thickness of all layers), of from about 0.5 to 10 mils (1 mil equals 0.001 inch); more preferably, from about 1 to 5 mils; still more preferably, from 1 to 3 mils; yet still more preferably, from about 1 to 2.5 mils. Most preferably, the multilayer film has a thickness of from about 1.5 to 2 mils.

In general, in the multilayer film of the present invention, the two outer layers each make up from about 10 to 80 weight percent of the total weight of the multilayer film. Furthermore, the second, or core layer, can also make up from about 10 to 80 weight percent of the total weight of the film. Preferably, the two outer layers each make up from about 10 to 40 weight percent of the total weight of the multilayer film, and preferably the core layer makes up from about 20 to 80 weight percent of the total weight of the multilayer film.

With respect to preferred multilayer films according to the present invention, in general, the outer layers, i.e., sealing layers, each have a thickness of from about 0.05 to 4 mils. Preferably, each of the sealing layers has a thickness of from about 0.1 mil to 2 mils, and more preferably, from about 0.1 mil to 1.2 mils., still more preferably, from about 0.3 mil to 0.8 mil, and most preferably, each of the sealing layers has a thickness of about 0.4 to 0.5 mil.

With respect to preferred multilayer films according to the present invention, in general, the core layer (or layers) has a thickness of from about 0.1 mil to 8 mils, preferably, from about 0.2 mil to 4 mils, and more preferably, from about 0.2 mil to 2.4 mils, still more preferably, from about 0.5 mil to 1 mil, and most preferably, from 0.6 to 0.8 mil.

In general, the multilayer film of the present invention has an oxygen transmission rate of from about 500 to 50,000 cc/m$^2$/24 hr STP., preferably, from about 1,000 to 20,000 cc/m$^2$/24 hr STP., more preferably, from about 2,000 to 10,000 cc/m$^2$/24 hr STP., most preferably, from about 3,000 to 6,000 cc/m$^2$/24 hr STP.

In general, the outer layers of the multilayer film of the present invention comprise any homogeneous ethylene/α-olefin copolymer which permits the multilayer film to have an oxygen transmission rate of from about 500 to 50,000 cc/m$^2$/24 hr STP. Although the outer film layers, i.e., the first and third layers in the preferred embodiment illustrated in FIG. 1, can have the same or differing chemical composition, preferably the outer layers comprise substantially identical ethylene/α-olefin copolymers. Preferably, the ethylene/α-olefin copolymers in the outer layers have a density of less than or equal to about 0.915 g/cc, i.e., up to and including about 0.915 g/cc.

Homogeneous ethylene/α-olefin copolymers may be characterized by one or more methods known to those of skill in the art, such as molecular weight distribution ($M_w/M_n$), composition distribution breadth index (CDBI), and narrow melting point range and single melt point behavior.

The molecular weight distribution ($M_w/M_n$), also known as polydispersity, may be determined by gel permeation chromatography. The homogeneous ethylene/α-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3.

The composition distribution breadth index (CDBI) of such homogeneous ethylene/α-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%.

The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The benefits to the present invention accrue through the use of specific homogeneous ethylene/α-olefin copolymers having the above-described narrow composition distribution. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982).

Preferably, the homogeneous ethylene/α-olefin copolymers in the first and third layers have a CDBI greater than about 70%, i.e., a CDBI of from about 70% to 99%.

In general, the homogeneous ethylene/α-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/α-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis.

DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

The presence of higher melting peaks is detrimental to film properties such as haze, and compromises the chances for meaningful reduction in the seal initiation temperature of the final film.

The homogeneous ethylene/α-olefin copolymer in the outer layers (i.e, the first and third homogeneous ethylene alpha-olefin copolymers) can, in general, be prepared by the copolymerization of ethylene and any one or more α-olefin. Preferably, the α-olefin is a $C_3$–$C_{20}$ α-monoolefin, more preferably, a $C_4$–$C_{12}$ α-monoolefin, still more preferably, a $C_4$–$C_8$ α-monoolefin. Still more preferably, the α-olefin comprises at least one member selected from the group consisting of butene-1, hexene-1, and octene-1, i.e., 1-butene, 1-hexene, and 1-octene, respectively. Most preferably, the α-olefin comprises octene-1, and/or a blend of hexene-1 and butene-1.

In general, the ethylene/α-olefin copolymer comprises a copolymer resulting from the copolymerization of from about 80 to 99 weight percent ethylene and from 1 to 20 weight percent α-olefin. Preferably, the ethylene α-olefin copolymer comprises a copolymer resulting from the copolymerization of from about 85 to 95 weight percent ethylene and from 5 to 15 weight percent α-olefin.

In general, the outer layers can consist essentially of homogeneous ethylene/α-olefin copolymer (or copolymers), or can have still additional polymers blended therewith. However, in each of the outer layers, the homogeneous ethylene/α-olefin is preferably present in an amount of at least about 50 weight percent, based on the weight of the respective outer layer. More preferably, the homogeneous ethylene/α-olefin is present in an amount of at least about 75 weight percent, based on the weight of the respective outer layer. Most preferably, the homogeneous ethylene/α-olefin is present in an amount of about 100 weight percent, based on the weight of the respective outer layer. If another polymer, i.e., a "secondary polymer", is present in admixture with the homogeneous ethylene/α-olefin copolymer, preferably this secondary polymer comprises at least one member selected from the group consisting of polyethylene, ethylene vinyl acetate, ethylene methyl acrylate, ethylene butyl acrylate, ethylene methyl acrylic acid, ionomer, and ethylene/α-olefin.

Preferably, the first film layer is directly adhered to a first side of the second film layer, and the third film layer is directly adhered to a second side of the second film layer.

The homogeneous ethylene/α-olefin copolymers can be prepared through the use of a metallocene catalyst, and/or any additional single site catalyst. Furthermore, the homogeneous ethylene/α-olefin copolymers can be prepared in accordance with any suitable polymerization process, including slurry polymerization, gas phase polymerization, and high pressure polymerization processes. U.S. Pat. Nos. 5,206,075, 5,241,031, and PCT International Application WO 93/03093, each of which is hereby incorporated by reference thereto, in its entirety, disclose homogeneous polymers and methods for making same.

Slurry polymerization processes generally use superatmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, the homogeneous ethylene/α-olefin copolymer is prepared by gas-phase polymerization. A gas-phase polymerization process utilizes super-atmospheric pressure and temperature in the range of about 50°–120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The homogeneous ethylene/α-olefin copolymer can also be produced by a high pressure process, in the presence of a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar ($kg/cm^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

Further details regarding the production and use of one genus homogeneous ethylene/α-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication No. WO 90/03414, in the name of Exxon Chemical Patents, Inc., all four of which are hereby incorporated in their entireties, by reference there. Still another genus of homogeneous ethylene/α-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

In general, although the multilayer film of the present invention can have a plurality of inner layers, including a plurality of tie layers as well as a plurality of core layers, most preferably the multilayer film of the present invention has no tie layers, and only one core layer as the sole inner layer of the film.

In general, core layer 12 comprises a polyolefin. Preferably, the core layer comprises at least one member selected from the group consisting of polyethylene homopolymer, polypropylene homopolymer, ethylene/α-olefin copolymer, propylene/ethylene copolymer, and ethylene/unsaturated ester copolymer. More preferably, the core layer comprises at least one member selected from the group consisting of propylene homopolymer and propylene/ethylene copolymer containing from 0.1 to 6 weight percent ethylene. Still more preferably, the core layer comprises a propylene/ethylene copolymer containing from about 0.1 to 6 weight percent ethylene wherein the propylene/ethylene copolymer is present in an amount of from about 50 to 100 weight percent, based on the weight of the core layer. Most preferably the core layer comprises a propylene/ethylene copolymer containing from about 2 to 5 weight percent ethylene, present in an amount of about 100 weight percent, based on the weight of the core layer.

Preferably, the polyolefin, or a preferred polyolefin, is present in the core layer in an amount of at least about 50 weight percent, based on the weight of the core layer, and more preferably, in an amount of at least about 75 weight percent, based on the weight of the core layer. Most preferably, a preferred polyolefin is present in an amount of about 100 weight percent, based on the weight of core layer.

As with the homogeneous ethylene/α-olefin copolymer polymer of the outer layers of the multilayer film of the present invention, the polymer or polymers in the inner layer, including both core layers as well as tie layers, can be produced in accordance with any suitable polymerization process, including slurry polymerization, gas phase polymerization, and high pressure polymerization processes, as discussed in above, in detail. Furthermore, the core and tie layer or layers can also be prepared through the use of a metallocene catalyst, and/or any additional single site catalyst, also as discussed above.

Regardless of whether the core layer comprises a single-site-catalyzed copolymer, the chemical composition of the second layer is different from the chemical composition of the first layer and the third layer. Preferably, the core layer has a greater heat resistance than the outer layers, and preferably, the core layer provides the majority of the mechanical strength (e.g., modulus, tensile strength, impact strength, etc) of the multilayer film.

Figure 2:
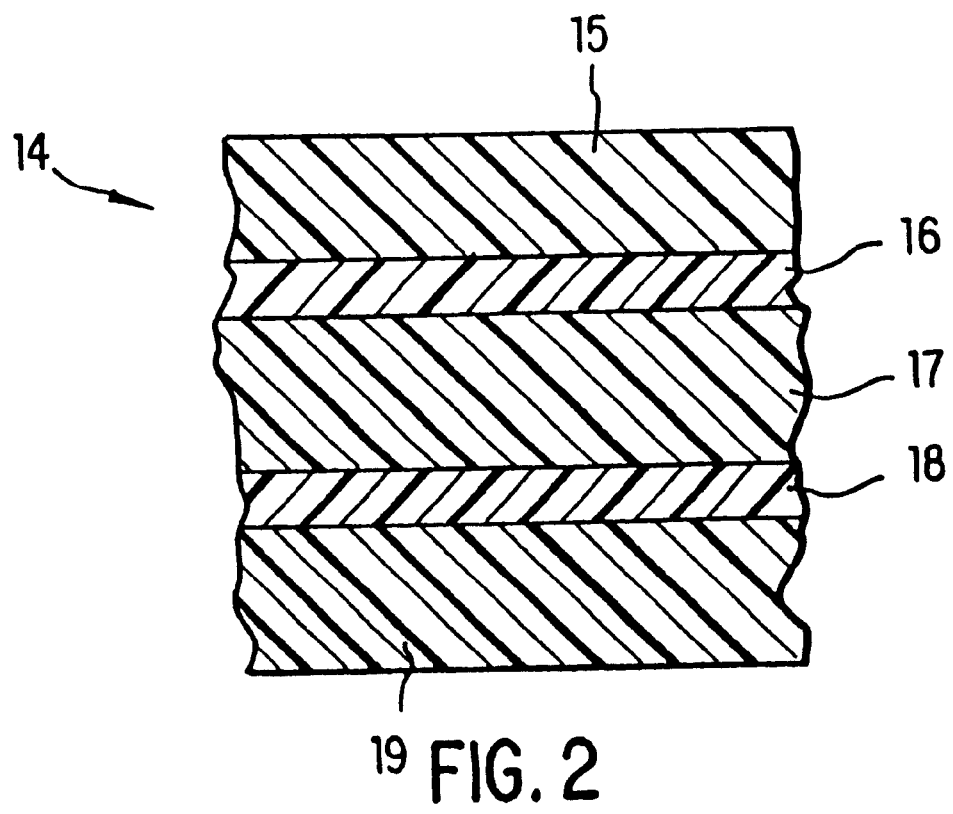
FIG. 2 illustrates an enlarged cross-sectional view of a five-layer multilayer film according to the present invention.

FIG. 2 illustrates a cross-sectional view of multilayer film 14 according to the present invention, which is an alternative of the preferred multilayer film illustrated in FIG. 1. In FIG. 2, multilayer film 14 is comprised of five layers, including first layer 15, second layer 16, third layer 17, fourth layer 18, and fifth layer 19. First layer 15, and fifth layer 19, which are outer layers, are preferably also sealing layers. Second layer 16 and fourth layer 18 are preferably tie layers. Third layer 19, a core layer, preferably functions to provide the multilayer film with desired physical properties, such as tensile strength, heat resistance, etc.

In general, tie layers 16 and 18 need be only thick enough to effectuate the desired tying function. Preferably, the tie layer or layers each has a thickness of from about 0.001 to 0.5 mil., more preferably from about 0.01 to 0.4 mil., and most preferably from about 0.1 to 0.3 mil.

Although most preferably the multilayer film of the present invention does not comprise a tie layer, in general, the multilayer film of the present invention can comprise one or more tie layers. In general, the tie layer or layers may comprise any polymer which adheres to both the layers which the tie layer is tying together. The composition, number, and thickness of the tie layer or layers are as known to those of skill in the art of films.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

Multilayer films in accordance with the present invention can be manufactured using film fabrication technologies well-known in the art. For example, the base film may be extruded into a film using a flat die, or extruded into a film using an annular die, and the heat seal layer formed thereon by solvent deposition, lamination or coextrusion techniques. However, the preferred method of manufacture of the multilayer film of the present invention is via simultaneous coextrusion, in an annular die, of all the layers of the multilayer film, including the outer (sealing) layers, the core layer, and optionally, the one or more tie layers.

Figure 3:
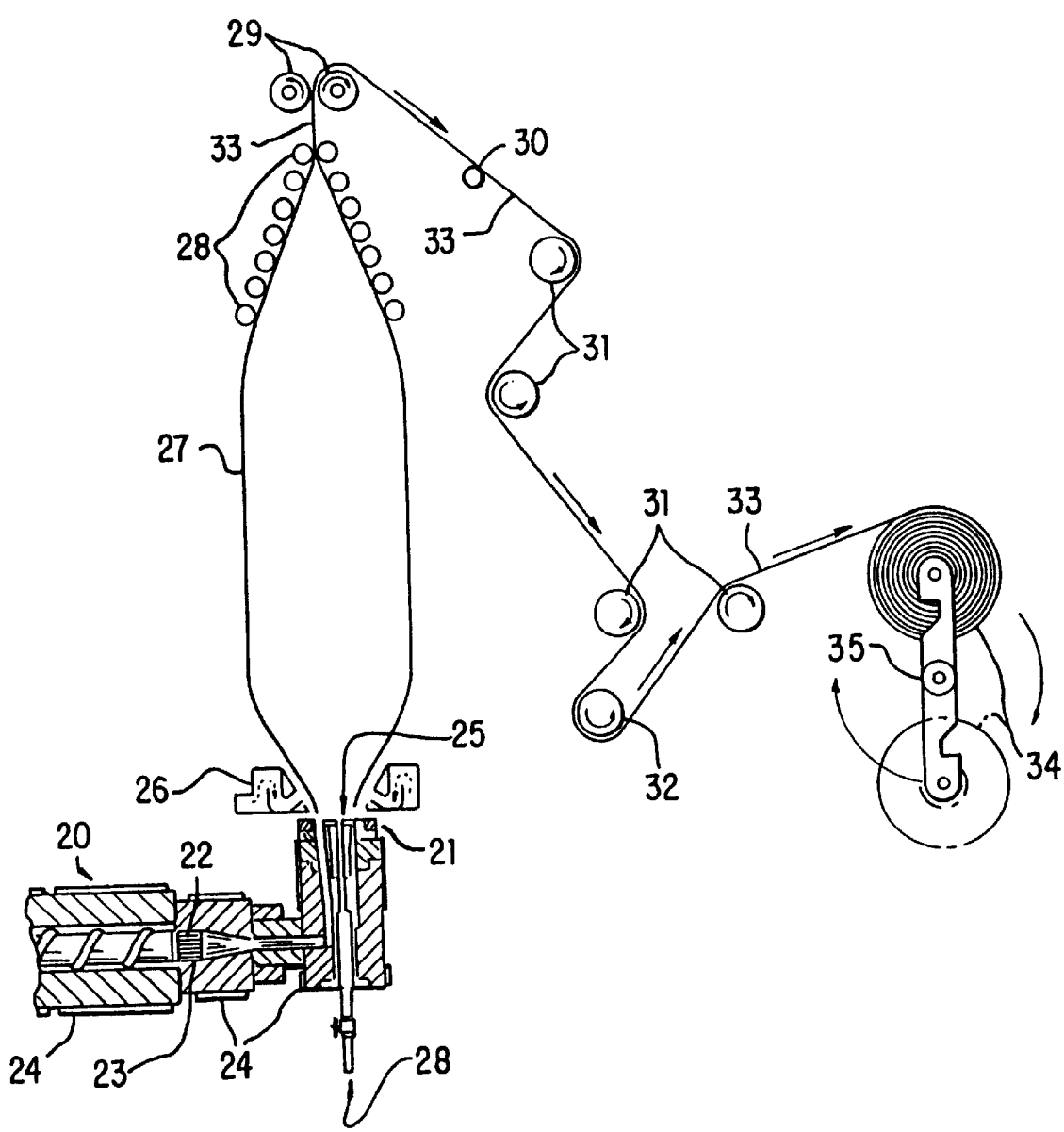
FIG. 3 illustrates a schematic view of a process according to the present invention.

FIG. 3 illustrates a schematic view of a process according to the present invention, for producing a multilayer film 10 in accordance with the present invention. Although for the sake of simplicity only one extruder 20 is illustrated in FIG. 3, there are preferably at least 2 extruders, and more preferably, at least three extruders. That is, preferably at least one extruder, and more preferably two extruders, supply molten polymer to coextrusion die 21 for the formation of, for example, outer layers 11 and 13 as illustrated in FIG. 1, and at least one additional extruder supplied molten polymer to coextrusion die 21 for the formation of, for example, core layer 12 as illustrated in FIG. 1. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 20 as an example, each of the extruders is preferably equipped with a screen pack 22, a breaker plate 23, and a plurality of heaters 24. Each of the coextruded film layers is extruded between mandrel 25 and die 21, and the extrudate is cooled by cool air flowing from air ring 26. The resulting blown bubble is thereafter guided into a collapsed configuration by nip rolls 29, via guide rolls 28. The collapsed tube is optionally passed over treater bar 30, and is thereafter passed over idler rolls 31, and around dancer roll 32 which imparts tension control to collapsed tube 33, after which the collapsed tube is wound into roll 34 via winding mechanism 35.

The process according to the present invention can, in general, be carried out the manner illustrated in FIG. 3. Preferably the process is carried out in a manner to result in the preferred multilayer film according to the present invention as described above. In order to extrude a first composition comprising the first ethylene/α-olefin copolymer to form the first layer, and extrude a second composition comprising the polyolefin to form the second layer, and extrude a third composition comprising the second ethylene/α-olefin of the third layer, it is necessary to carry out the process by selecting and proportioning each of these three chemical compositions in an manner to result in a multilayer film having a second layer between the first and third layers, and to provide the multilayer film with an oxygen transmission rate of from about 500 to 50,000 cc/m$^2$/24 hr STP. The details of selecting and proportioning are readily evident to those of skill in the art in view of the above detailed description of the multilayer film of the present invention. Preferably, the process is carried out to result in a preferred film according to the present invention.

Although the multilayer film of the present invention is preferably not irradiated, optionally the film may be irradiated. In the irradiation process, the film is subjected the film to an energetic radiation treatment, such as corona discharge, plasma, flame, ultraviolet, X-ray, gamma ray, beta ray, and high energy electron treatment, which induce cross-linking between molecules of the irradiated material.

Radiation dosages are referred to herein in terms of the radiation unit "RAD", with one million RADS, also known as a megarad, being designated as "MR". A suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

Figure 4:
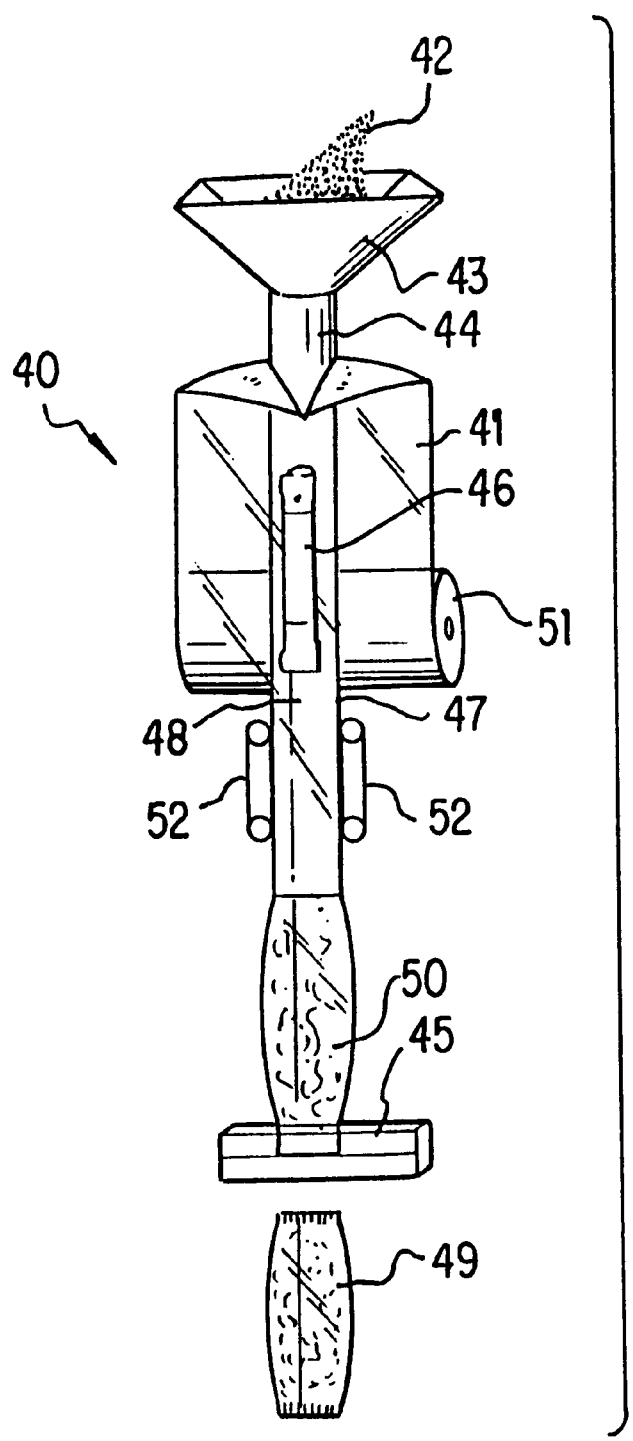
FIG. 4 illustrates a vertical form fill and seal apparatus to be used in packaging process according to the present invention.

FIG. 4 illustrates a vertical form fill and seal apparatus to be used in packaging process according to the present invention. Vertical form fill and seal equipment is well known to those of skill in the packaging arts. The following documents disclose a variety of equipment suitable for vertical form fill and seal: U.S. Pat. Nos. 2,956,383; 3,340,129 to J. J. GREVICH; U.S. Pat. No. 3,611,657, to KIYOSHI INOUE, et. al.; U.S. Pat. No. 3,703,396, to INOUE, et. al.; U.S. Pat. No. 4,103,473, to BAST, et. al.; U.S. Pat. No. 4,506,494, to SHIMOYAMA, et. al.; U.S. Pat. No. 4,589,247, to ; U.S. Pat. No. 4,532,752, to TAYLOR; U.S. Pat. No. 4,532,753, to KOVACS; U.S. Pat. No. 4,571,926, to SCULLY; and Great Britain Patent Specification No. 1, 334 616, to de GROOT, et. al., each of which is hereby incorporated in its entirety, by reference thereto.

In FIG. 4, a vertical form fill and seal apparatus 40 is schematically illustrated. Apparatus 40 utilizes multilayer film 41 according to the present invention. Product 42, to be packaged, is supplied to apparatus 40 from a source (not illustrated), from which a predetermined quantity of product 42 reaches upper end portion of forming tube 44 via funnel 43, or other conventional means. The packages are formed in a lower portion of apparatus 40, and flexible sheet material 41 from which the bags or packages are formed is fed from roll 51 over certain forming bars (not illustrated), is wrapped about forming tube 44, and is provided with longitudinal seal 47 by longitudinal heat sealing device 46, resulting in the formation of vertically-oriented tube 48. End seal bars 45 operate to close and seal horizontally across the lower end of vertically-sealed tube 48, to form pouch 50 which is thereafter immediately packed with product 42. Film drive belts 52, powered and directed by rollers, as illustrated, advance tube 48 and pouch 50 a predetermined distance, after which end seal bars 45 close and simultaneously seal horizontally across the lower end of vertically-sealed tube 48 as well as simultaneously sealing horizontally across upper end of sealed pouch 49, to form a product packaged in sealed pouch 49. The next pouch 50, thereabove, is then filled with a metered quantity of product 42, forwarded, and so on. It is also conventional to incorporate with the end seal bars a cut-off knife (not shown) which operates to sever a lower sealed pouch 49 from the bottom of upstream pouch 50.

In carrying out the packaging process of the present invention, preferably the vertical form fill and seal machine forms, fills, and seals at least 15 packages per minute, preferably from about 15 to 45 packages per minute, without substantial burn through of the film at the seals.

Although the packaging process may be carried out with any film according to the present invention, the packaging process is preferably carried out using a preferred film according to the present invention. Preferably, the film is sealed at the lowest possible temperature at which relatively strong seals are produced. In general, the film is sealed at a temperature of from about 70° C. to 150° C.; more preferably, from about 80° C. to 140° C., and still more preferably, from about 90° C. to 130° C.

As is apparent from the data for the hot tack strength of the multilayer film of the present invention as provided for Examples 1–3 in Table I below, surprisingly it has been discovered that preferred multilayer films of the present invention exhibit a hot tack strength of from about 4 to 15 Newtons. More particularly, in contrast to hot tack strength of only 1.6 and 2.7 Newtons for Example 4 (comparative) and Example 5 (comparative), the hot tack strength for Examples 1–3 is 10.9 Newtons, 6.8 Newtons, and 8.8 Newtons, respectively.

In general, the packaging process is carried out with the packaging of an oxygen-sensitive product. Preferably, the oxygen-sensitive product comprises at least one cut vegetable selected from the group consisting of lettuce, cabbage, broccoli, green beans, cauliflower, spinach, kale, carrot, onion, radish, endive, and escarole; more preferably, at least one member selected from the group consisting of lettuce, cabbage, green beans, kale, carrot, onion, radish, endive, and escarole, where the film has an oxygen permeability of from about 2000 to 10,000 cc/m$^2$/24 hr STP.

Figure 5:
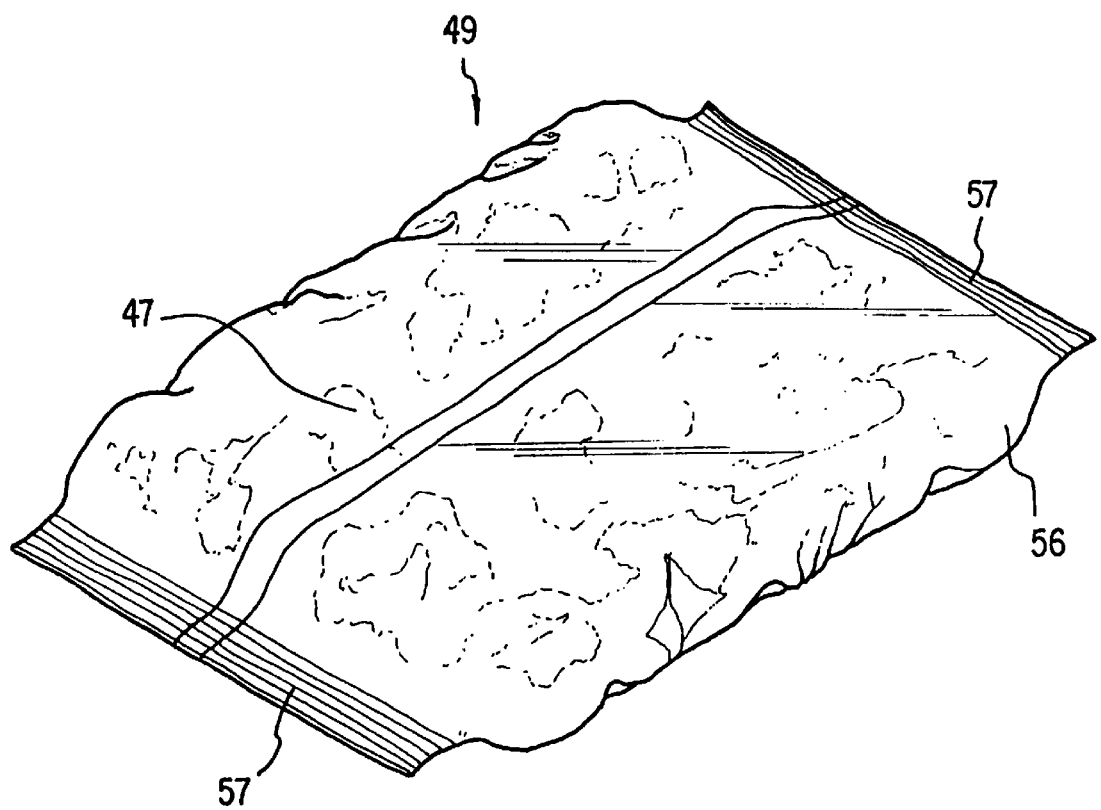
FIG. 5 illustrates a packaged product of the present invention, the product being packaged in the multilayer film of the present invention.

FIG. 5 illustrates one embodiment of a packaged product 49 of the present invention, the product being packaged in sealed pouch 56 having vertical seal 47 and end seals 57. Package 56 is a multilayer film of the present invention as produced in a vertical form fill and seal apparatus, in accordance with the packaging process of the present invention as described above.

In general, the product in the package can be any oxygen-sensitive product, as described above. Preferably, the oxygen-sensitive product comprises at least one cut vegetable selected from the group consisting of lettuce, cabbage, broccoli, green beans, cauliflower, spinach, kale, carrot, onion, radish, endive, and escarole; more preferably, at least one member selected from the group consisting of lettuce, cabbage, green beans, kale, carrot, onion, radish, endive, and escarole, where the film has an oxygen permeability of from about 2000 to 10,000 cc/mil/m$^2$/24 hr STP., and, still more preferably, an oxygen permeability of from about 3000 to 6000 cc/m$^2$/24 hr STP.

The invention is illustrated by the following examples, which are provided for the purpose of representation, and are not to be construed as limiting the scope of the invention. Unless stated otherwise, all percentages, parts, etc. are by weight.

EXAMPLES 1–3

A series of coextruded, unoriented, multilayer films were produced on conventional hot blown film equipment equipped with a multilayer annular die, to produce films having an A/B/A-type structure. The films had average thicknesses of from 1.5 to 2.0 mils. For each film, the two sealing layers consisted of a metallocene-catalyzed ethylene/hexene/butene terpolymer having a density of 0.900 gm/cc, and a melt index of 1.2 gm/10 min (using Condition E of ASTM D-1238), with average thickness of from 0.4 mils to 0.8 mils per layer, i.e., 22% to 44% of the total thickness of the multilayer film. The metallocene-catalyzed polyethylene was preblended with a slip/antiblock concentrate, known as FSU93E, obtained from A. Schulman of Akron, Ohio, to allow easy separation of the film plys at the winder, and for good machinability on the VFFS packaging equipment.

The B-layer, i.e., the core layer, consisted of either a propylene/ethylene copolymer, or a polypropylene homopolymer. The propylene homopolymer, used as the core layer in Example 1, had a density of 0.900 g/cc and a melt flow rate of 3.6 g/10 min (Condition L of ASTM D-1238). The propylene/ethylene copolymer in the B-layer of Example 2 contained about 3.3 weight percent ethylene, and had a density of 0.895 g/cc and a melt flow rate of 3.8 g/10 min. (Condition L of ASTM D-1238). The B-layer used in Example 3 was a propylene/ethylene copolymer containing about 5 weight percent ethylene, and had a density of 0.890 g/cc and a melt flow rate of 3.1 g/10 min. (Condition L of ASTM D-1238).

The polymer formulations for the A-layers and B-layer were then fed into the hoppers of extruders which feed the coextrusion die. The materials were coextruded through an annular coextrusion die, exited the die, and were blown to a desired width while simultaneously being cooled with an air ring. The cooled film was then collapsed, ply separated, and wound on cores for further processing. The films were especially suitable for use as rollstock for VFFS equipment. The films were also especially suitable for the packaging of oxygen-sensitive products, such as lettuce.

EXAMPLE 4

Comparative

A multilayer oriented film was produced by coextruding an A/B/A-structure on a conventional extrusion line equipped with a multilayer annular die. The extrudate was quenched with water. The A-layer was a blend of 50% linear low density polyethylene [LLDPE(1)], 25% ethylene vinyl acetate (EVA), and 25% linear medium density polyethylene [LLDPE(2)]. The B-layer was a blend of 30% ethylene butyl acrylate (EBA) and 70% very low density polyethylene (ULDPE). After extrusion and quenching, the film was irradiated, by bombarding the film with high energy electrons from an accelerator, using a radiation dosage of 3 megrads (MR). The film was then reheated, and continuously inflated into a bubble by internal air pressure, to stretch and orient the film. An orientation ratio of 25 was obtained by drawing 5.0× in the machine direction, and stretching 5.0× in the transverse direction. The bubble was then deflated and wound onto cores for further processing.

As is evident from the information provided in Table I, the film of Example 4 (comparative) has sealing characteristics and optical properties inferior to the films of the present invention as set forth in Examples 1–3. Furthermore, the oxygen and carbon dioxide transmission rates for the film of Example 4 (comparative) is too high for VFFS packaging of precut lettuce, so that packages made from the film according to Example 4 (comparative) exhibit pink ribbing, as a result of the cut lettuce product being exposed to an undesirably high amount of oxygen.

EXAMPLE 5

Comparative

A monolayer unoriented blown film was produced on conventional hot blown film equipment equipped with a multilayer annular die. The film had an average thickness of 3 mils. The resin used to produce the film was a linear low density polyethylene [LLDPE(3)] with a density of 0.919 g/cc and a melt index of 0.75 g/10 min. The resin was preformulated with a slip/antiblock package.

As is apparent from the data provided in Table I, while the film of Example 5 (comparative) is suitable for VFFS packaging of precut lettuce, it has optical and seal characteristics inferior to the optical and seal characteristics of films according to the present invention, as exemplified by Examples 1–3.

EXAMPLE 6

VFFS Packaging

The film made in Example 2 was slit to a width of 31 inches, and used in a Hayssen Ultima CMB VFFS machine. The model number of the machine was 15/22 HPR. The machine was equipped with a constant heat seal bar with temperature settings of 245° F., 250° F., and 240° F., on the front of the seal jaw, rear seal jaw, and longitudinal platen, respectively. Packages measuring 15"×15" and containing 5 lbs. of shredded iceberg lettuce, were made at the rate of 29 per minute for 1 hour. Finished packages withstood a vacuum of 15 in. Hg on a Visual Check.

Table I identifies, for Examples 1–5, the number and a arrangement of layers in the film, oxygen transmission rate and carbon dioxide transmission rate data, hot tack strength, seal initiation temperature, and optical properties. Notably, the hot tack seal strength for Examples 1–3, i.e., multilayer films according to the present invention, are notably higher than hot tack seal strength values obtained for the films of Example 4 (comparative) and Example 5 (comparative).

Table II identifies the various resins utilized in preparation of the films of Examples 1–5.

TABLE I

| | 1 | 2 | 3 | 4 | 5 |
|---|---|---|---|---|---|
| Structure | A/B/A | A/B/A | A/B/A | A/B/A | A |
| Where A = | MCPE | MCPE | MCPE | 50% LLDPE(i)+25% EVA +25% LLDPE(2) | LLDPE(3) |
| Where B = | PP | EPC(1) | EPC(2) | 30% EBA + 70% ULDPE | — |
| Gauge (mils) | .4/.7/.4 | .6/.6/.6 | .5/.8/.5 | .31/.63/.31 | 3 |
| OTR (cc/m²/24 hr. STP) | 3546 | 5118 | 4960 | 7691 | 3571 |
| CO2TR (cc/m²/24 hr. STP) | 11034 | 15659 | 13776 | 18705 | 11677 |

TABLE I-continued

|  | 1 | 2 | 3 | 4 | 5 |
|---|---|---|---|---|---|
| Peak Hot Tack (N) | 10.9 | 6.8 | 8.8 | 1.6 | 2.7 |
| Seal Initiation Temp. (deg C.) | 80 | 85 | 85 | 120 | 100 |
| Haze (%) | 7.1 | 4.2 | 4.5 | 6.5 | 10 |
| Gloss (45 deg.) | 78 | 83 | 84 | 84 | 72.8 |

TABLE II

| ABBREVIATION | COMMERCIAL NAME | SUPPLIER | LOCATION |
|---|---|---|---|
| MCPE = | EXACT 3033 | EXXON | Baytown, TX |
| PP = | PD 4062 | EXXON | Baytown, TX |
| EPC(1) = | PD 9032 | EXXON | Baytown, TX |
| EPC(2) = | PD 9272 | EXXON | Baytown, TX |
| LLDPE(1) = | Dowlex 2045 | DOW | Freeport, TX |
| EVA = | PE1335 | REXENE | Odessa, TX |
| LLDPE(2) = | Dowlex 2037.01 | DOW | Freeport, TX |
| EBA = | EA 719-009 | QUANTUM | Cincinnati, OH |
| VLDPE = | Attane 4203 | DOW | Freeport, TX |
| LLDPE(3) = | Sclair 11L4 | DUPONT CANADA | Sarnia, Ontario |

Although the present invention has been described with reference to particular means, materials, and embodiments, it should be noted that the invention is not to be limited to the particulars disclosed, and extends to all equivalents within the scope of the claims.

What is claimed is:

1. A packaged product comprising:

an oxygen-sensitive product; and a package substantially surrounding the oxygen-sensitive product, the package comprising a multilayer film having a thickness of from about 0.5 to 10 mils, the multilayer film comprising a core layer between first and second outer layers, wherein:

the first outer layer comprises a homogeneous ethylene/alpha-olefin copolymer;

the second outer layer comprises a homogeneous ethylene/alpha-olefin copolymer; and the core layer comprises a polymer selected from the group consisting of ethylene homopolymer, propylene, homopolymer, ethylene/alpha-olefin copolymer, propylene/ethylene copolymer, and ethylene/unsaturated ester copolymer; and the multilayer film has an oxygen transmission rate of from about 500 to 50,000 $cc/m^2/24$ hours when measured at standard temperature and pressure.

2. The packaged product of claim 1 wherein said oxygen transmission rate ranges from about 3000 to about 6000 $cc/m^2/24$ hr when measured at standard temperature and pressure.

3. The packaged product of claim 1 wherein the first outer layer has a thickness of from about 0.3 to 0.8 mils.

4. The packaged product of claim 1 wherein said multilayer film is unoriented.

5. The packaged product of claim 1 wherein the core layer has a thickness of from about 0.5 to 1.0 mils.

6. The packaged product of claim 5 wherein the first and second outer layers each have a thickness of from about 0.3 to 0.8 mils and are directly adhered to the core layer.

7. The packaged product of claim 6 wherein said multilayer film is unoriented.

8. The packaged product of claim 6 wherein said oxygen transmission rate ranges from about 3000 to about 6000 $cc/m_2/24$ hr when measured at standard temperature and pressure.

9. The packaged product of claim 1 wherein the oxygen-sensitive product comprises a vegetable selected from the group consisting of lettuce, cabbage, broccoli, green beans, cauliflower, spinach, kale, carrot, onion, radish, endive, and escarole.

10. The packaged product of claim 1 wherein said package is formed by a vertical form-fill-seal process.

11. The produce package of claim 1 wherein the oxygen-sensitive product comprises a cut vegetable.

12. The packaged product of claim 1 wherein the oxygen-sensitive product comprises a vegetable.

13. The packaged product of claim 1 wherein the core layer comprises a polymer selected from the group consisting of ethylene homopolymer, propylene homopolymer, propylene/ethylene copolymer, and ethylene/unsaturated ester copolymer.

14. The packaged product of claim 1 wherein the core layer comprises a polymer selected from the group consisting of propylene homopolymer and propylene/ethylene copolymer.

15. The packaged product of claim 1 wherein the core layer comprises propylene homopolymer.

16. The packaged product of claim 1 wherein the core layer comprises at least about 75 weight percent propylene homopolymer, based on the weight of the core layer.

17. The packaged product of claim 1 wherein the core layer comprises about 100 weight percent propylene homopolymer, based on the weight of the core layer.

18. The packaged product of claim 1 wherein the multilayer film has only one core layer.

19. The packaged product of claim 1 wherein the multilayer film has only three film layers.

20. The packaged product of claim 19 wherein the multilayer film is formed by coextruding the first and second outer layers and the core layer.

21. The packaged product of claim 1 wherein wherein the core layer has greater heat resistance than the first and second outer layers.

22. The packaged product of claim 1 wherein the core layer provides the majority of the mechanical strength of the multilayer film.

23. The packaged product of claim 1 wherein the multilayer film is free from tie layers.

24. The packaged product of claim 1 wherein the first and second outer layers are of substantially identical thickness.

25. The packaged product of claim 1 wherein the core layer is thicker than each of the outer layers.

26. The packaged product of claim 1 wherein the multilayer film is formed by coextruding the first and second outer layers and the core layer.

27. The packaged product of claim 1 wherein the first outer layer is directly adhered to the core layer.

28. The packaged product of claim 1 wherein the oxygen-sensitive product is sealed within the package.

29. The packaged product of claim 1 wherein the core layer is at least as thick as each of the outer layers.

30. The packaged product of claim 1 wherein the core layer comprises a heterogeneous ethylene/alpha-olefin copolymer.

31. The packaged product of claim 1 wherein the core layer is chemically different from the first and second outer layers.

32. The packaged product of claim 1 wherein the film has an oxygen transmission rate of from about 1000 to about 20,000 cc/m$^2$/24 hr when measured at standard temperature and pressure.

33. The packaged product of claim 1 wherein the homogeneous ethylene/alpha-olefin copolymer of both the first and second outer layers has a density of less than about 0.915 g/cc.

34. The packaged product of claim 1 wherein the first outer layer comprises homogeneous ethylene/alpha-olefin copolymer having a melting point of up to 110° C.

35. The packaged product of claim 1 wherein:

the first outer layer comprises a homogeneous ethylene/alpha-olefin copolymer resulting from the copolymerization of from about 95 to 85 weight percent ethylene, based on total monomer weight, and from about 5 to 15 weight percent of a first alpha-olefin, based on the total monomer weight, wherein the first alpha-olefin comprises at least one member selected from the group consisting of butene-1, hexene-1, and octene-1; and the second outer layer comprises a homogeneous ethylene/alpha-olefin copolymer resulting from the copolymerization of from about 95 to 85 weight percent ethylene, based on total monomer weight, and from about 5 to 15 weight percent of a first alpha-olefin, based on the total monomer weight, wherein the first alpha-olefin comprises at least one member selected from the group consisting of butene-1, hexene-1, and octene-1.

36. The packaged product of claim 1 wherein the film has an oxygen transmission rate of from about 2000 to about 10,000 cc/m$^2$/24 hr when measured at standard temperature and pressure.

37. The packaged product of claim 1 wherein the first and second outer layers have a substantially identical composition.

* * * * *